(12) United States Patent
Garrettson et al.

(10) Patent No.: US 7,093,787 B2
(45) Date of Patent: Aug. 22, 2006

(54) LIGHTNING STRIKE MITIGATION SYSTEM

(75) Inventors: Brook Garrettson, San Jose, CA (US);
Hugh M. Reynolds, San Jose, CA (US); James P. Hornick, San Jose, CA (US)

(73) Assignee: United Technologies Corporation, Hartford, CT (US)

( * ) Notice: Subject to any disclaimer, the term of this patent is extended or adjusted under 35 U.S.C. 154(b) by 16 days.

(21) Appl. No.: 10/424,435

(22) Filed: Apr. 28, 2003

(65) Prior Publication Data

US 2006/0027700 A1 Feb. 9, 2006

(51) Int. Cl.
*B64D 45/02* (2006.01)

(52) U.S. Cl. ............... 244/1 A; 361/217; 361/218

(58) Field of Classification Search ........... 244/1 A; 428/256, 283, 406; 169/DIG. 2; 361/218
See application file for complete search history.

(56) References Cited

U.S. PATENT DOCUMENTS

| | | | | |
|---|---|---|---|---|
| 1,553,087 A | * | 9/1925 | Lehmann | 244/126 |
| 3,989,984 A | * | 11/1976 | Amason et al. | 361/212 |
| 4,755,422 A | * | 7/1988 | Headrick et al. | 442/7 |
| 4,839,771 A | * | 6/1989 | Covey | 361/218 |
| 6,500,275 B1 | * | 12/2002 | Lai et al. | 134/42 |

OTHER PUBLICATIONS http://www.lockheedmartin.com/michoud/products/tpp/tpp_ma25.htm; "Thermal Protection Products, Technical Data: MA-25 Product Information" Jun. 16, 2003.*

* cited by examiner

*Primary Examiner*—Michael J. Carone
*Assistant Examiner*—Gabriel Sukman
(74) *Attorney, Agent, or Firm*—Bachman & LaPointe, P.C.

(57) ABSTRACT

A lightning strike mitigation system for protecting a surface includes an inner insulating layer adjacent a surface to be protected, an outer insulating layer, and an intermediate layer formed from an electrically conductive material between the inner and outer insulating layers. The inner and outer insulating layers may be formed from an ablative insulating material containing no metal fill, an ablative insulating material containing a 15% Ni fill, or an ablative insulating material containing a 30% Ni fill. The electrically conductive material may be a mesh material or a foil material formed from an electrically conductive material or materials.

13 Claims, 1 Drawing Sheet

US 7,093,787 B2

LIGHTNING STRIKE MITIGATION SYSTEM

U.S. GOVERNMENT RIGHTS

The invention was made with U.S. Government support under contract LR-01N4501 awarded by the Department of the Army (Ballistic Missile Defense Office). The U.S. Government may have certain rights in the invention.

BACKGROUND OF THE INVENTION

The present invention relates broadly to a lightning strike mitigation system and more particularly, a lightning strike mitigation system which may be used to protect aircraft and/or spacecraft.

Spacecraft, aircraft, and rocket motors often operate in an air environment where the temperature is greater than 2500° R and components are subjected to multiple Mach speed fluid shear. There is a need to maintain the protected airframe surface temperatures at or below 745° R. This requirement stands even after multiple lightning strikes are realized at different surface locations anytime during flight. One of several challenges to designers is to minimize the conduction of heat into the material beneath the exposed outside surface such that the least thickness and mass of ablative insulation material will adequately protect the airframe surface from overheating for a given mission and/or service life of the airframe. Another challenge is to formulate the component materials and to assemble them to specification onto an airframe with minimum cost and with little or no environmental/safety concern.

SUMMARY OF THE INVENTION

Accordingly, it is an object of the present invention to provide a lightning strike mitigation system which maintains protected airframe surface temperature at desired levels.

The foregoing object is attained by the lightning strike mitigation system of the present invention.

In accordance with the present invention, a lightning strike mitigation system for protecting a surface broadly comprises an inner insulating layer adjacent a surface to be protected, an outer insulating layer, and an intermediate layer formed from an electrically conductive material between the inner and outer insulating layers. The inner and outer insulating layers may be formed from an ablative insulating material containing no metal fill, an ablative insulating material containing a 15% Ni fill, or an ablative insulating material containing a 30% Ni fill. The electrically conductive material may be a mesh material or a foil material formed from a copper containing material or an aluminum containing material.

Other details of the lightning strike mitigation system of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

In accordance with the present invention, a lightning strike mitigation system is provided which answers the challenges discussed hereinbefore. The lightning strike mitigation system places a conductive material, such as a mesh screen or foil, at or near mid-layer in the ablative insulation material. It has been found that by providing enough thickness of insulation material above the conductive material, the temperature of the conductive material will be maintained below that of melt and/or thermal damage during the most extreme expected airframe scenarios without lightning strikes. Still further, the system has enough insulation material thickness between the conductive material and the airframe surface that in the case of lightning strikes, there remains adequate thickness insulation material beneath a strike-damaged region and the conductive material to insulate the protected surface and maintain its temperature to within specification during the most extreme expected airframe service scenarios, regardless of the timing of the lightning strike(s) during a mission and/or service life.

Figure 1:
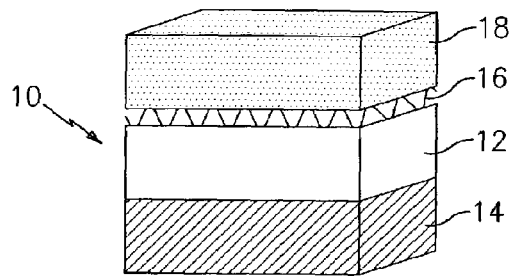
FIG. 1 is a schematic representation of a first embodiment of a lightning strike mitigation system in accordance with the present invention applied to a surface of a vehicle.

Referring now to FIG. 1, a first embodiment of a lightning strike mitigation system 10 is illustrated. In this embodiment, a first layer 12 of ablative insulating material is formed adjacent the protected airframe surface 14 of a vehicle such as an aircraft, spacecraft, missile, or rocket. The protected airframe surface 14 may be formed from any suitable metallic, semi-metallic, or non-metallic material known in the art, e.g. a cured carbon epoxy material. The layer 12 is formed from an ablative insulator with no metal fill. The layer 12 has a thickness sufficient to insulate/protect the airframe surface for the entire service life assuming there are no protective layers intact above it. The thickness of layer 12 is determined by testing and analysis given the flight environment, speed, duration and service life margins of safety. An electrically conductive material 16, such as a copper or aluminum mesh, is placed on top of the ablative insulating layer 12. Mesh 0.10" thick or less with 70–80% open area is preferred, unrestricted. Finally, the system 10 has an outer layer 18 of ablative insulating material with 30% nickel fill on top of the electrically conductive material 16. Layer 18 may be a multi-layer, non-homogeneous material of composite makeup. The layer 18 has a thickness sufficient to keep the metal screen/mesh/foil and bondline sufficiently insulated during the entire service life. This thickness is determined by testing and analysis given the flight environment, speed, duration and service life margins of safety.

Figure 2:
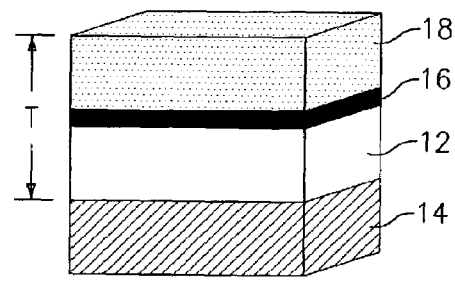
FIG. 2 is a schematic representation of a second embodiment of a lightning strike mitigation system in accordance with the present invention.

Referring now to FIG. 2, a second embodiment of a lightning strike mitigation system 10 is illustrated. In this embodiment, the inner layer 12 and the outer layer 18 are formed from the same materials as used in the first embodiment having the same thicknesses. This embodiment differs in that the electrically conductive material layer 16 is formed from a copper or aluminum foil.

Figure 3:
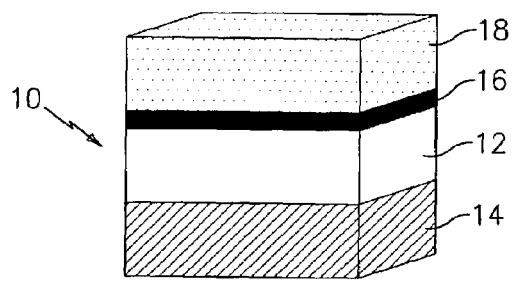
FIG. 3 is a schematic representation of a third embodiment of a lightning strike mitigation system in accordance with the present invention.

FIG. 3 illustrates a third embodiment of a lightning strike mitigation system 10. In this embodiment, the inner layer 12 is formed from an ablative insulating material with no metal fill, while the outer layer 18 is formed from an ablative insulating material with a 15% nickel fill. Layers 12 and 18 may be a multi-layer, non-homogeneous material of composite makeup. Materials components may include, but are not limited to, filled/unfilled R. E. Darling EP688, AST Sil-Cork, Cytek MXS 385, FMI Flexfram 605 TH, Dapco 2100 and 2900, Kirkhill Fastblock 301, 304 and 800, Lockheed Martin MA-25, custom-filled mixture utilizing base silicone used in Lockheed Martin MA-25, Aerotherm Acusil, filled/unfilled Electrolite ELC-325, filled Insulcast RTVS828 and Techno TSE-3331, filled/unfilled polyimide. The electrically conductive layer 16 is preferably formed from a copper, copper base alloy, aluminum, or aluminum-based alloy foil. The layer 16 may have any thickness with 0.0015"–0.008" preferred nominal. Pure Al is a preferred material, but alloys are desirable for ease of assembly and improved strength. Most available Al foils are alloys to facilitate the rolling process used in their production. Other foils may include, but are not limited to, those using copper, stainless steel, molybdenum, silver, gold, tungsten, chromium, nickel, platinum, titanium, superconductors and mixtures thereof.

Figure 4:
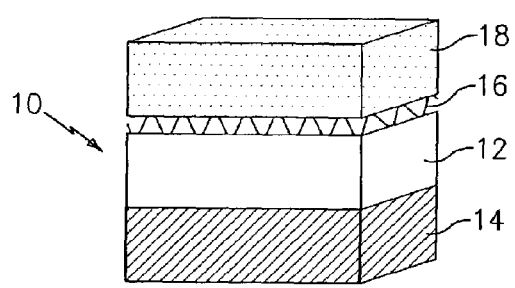
FIG. 4 is a schematic representation of a fourth embodiment of a lightning strike mitigation system in accordance with the present invention.

FIG. 4 illustrates a fourth embodiment of a lightning strike mitigation system 10 wherein the inner and outer layers 12 and 18 are formed from the same materials as in the embodiment of FIG. 3. In this embodiment, the electrically conductive layer 16 is formed from a copper or aluminum mesh material.

Figure 5:
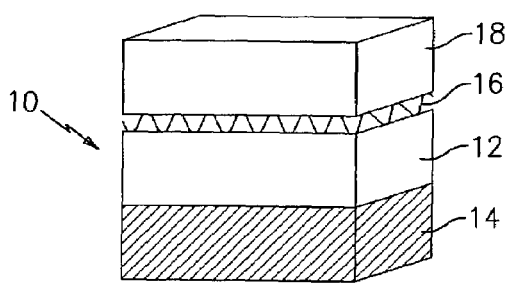
FIG. 5 is a schematic representation of a fifth embodiment of a lightning strike mitigation system in accordance with the present invention.

FIG. 5 illustrates yet another embodiment of a lightning strike mitigation system 10 in accordance with the present invention. In this embodiment, the inner and outer layers 12 and 18 are each formed from an ablative insulating material with no metal fill and the electrically conductive layer 16 is formed from a copper or aluminum mesh.

The electrically conductive material layer 16 is preferably located at or near the mid-point of the overall thickness T of the lightning strike mitigation system 10.

The finished product has the ablative insulation material sprayed onto a final bond surface, protected airframe surface or onto a releasable contoured mold surface. The system is installed by spraying layer 12, placing the conductive material over the layer 12, and then spraying the outer layer. Alternatively, each layer could be constructed separately and bonded together onto the airframe surface either layer-by-layer or as an assembly. The conductive material is in place at or near midlayer before the assembly is cured. If the lightning strike mitigation system is prepared and cured on a releasable mold surface, it is then removed for secondary installation onto a final bond surface. Once the lightning strike mitigation system is installed onto a protected airframe surface, the midlayer conductive material forms a reliable electrical connection with the airframe to act as a ground plane with an effectivity that is undiminished even after several lightning strikes.

Layers 12 and 18 may be sprayed using a normal pressure spray system for pre-mixed or non-mixed materials or a convergent spray system for non-premixed and/or non-homogenous layer spraying. Pressures, spray and cure rates and times depend upon the exact base material and fill mixture ratios used as well as the utilized fabrication and cure environments. Layer 12 is applied either in steps to allow cure time in between them or all at one time followed by partial cure of the layer followed by a thin wet coat of layer 12 then application of screen/mesh/foil (primed, if necessary) followed by application of layer 18 either in steps allowing cure time in-between or all at once. The sprayed material at the conductor level may be of different fill content than the main sections of layers 12 and 18. Layers 12 and 18 may be composite and non-homogenous and need not be of like materials and mixtures.

The lightning strike mitigation system of the present invention has numerous advantages. It may be applied to a surface of a vehicle such as an aircraft, a rocket, or a missile. It can also be applied to a surface of a rocket motor, an engine, a booster, and/or other exposed components. It can sustain a lightning strike with acceptable levels of damage to itself while rendering the protected surface undamaged. The system insulates the protected surface from aero-heating and maintains the protected surface temperature at or below a maximum allowable during a full severity Mach flight after several lightning strikes at different surface locations. The lightning strike mitigation system provides a favorable performance-to-mass ratio and cost and bi-axially expands with the protected surface without cracking, tearing or unbending during a mission. The lightning strike mitigation system of the present invention performs its function at virtually all tactical operating temperatures and heat flux levels, acts as an effective electrical ground plane, renders itself compatible with proprietary and silcork ablative materials, acts as a plug-in replacement for the specified phenolic cork sheet material, minimally impacts the outer mold line size of an airframe in reference to that of the specified phenolic cork sheet, and does not impose unmitigatible environmental or safety concerns.

If desired, the electrical conductive layer, either in mesh form or foil form may be formed from a material selected from the group consisting of an electrically conductive material, a semi-conductive material, a superconductive material and mixtures thereof.

It is apparent that there has been provided in accordance with the present invention a lightning strike mitigation system which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A lightning strike mitigation system for protecting a surface comprising an inner insulating layer adjacent a surface to be protected, an outer insulating layer, and an intermediate layer formed from an electrically conductive material between said inner and outer insulating layers and at least one of said inner and outer layers being formed from an ablative insulating material with a 15% Ni fill.

2. A lightning strike mitigation system according to claim 1, wherein said electrically conductive layer comprises a mesh material formed from a copper material or an aluminum material.

3. A lightning strike mitigation system according to claim 1, wherein said electrically conductive layer comprises a foil material formed from a copper material or an aluminum material.

4. A lightning strike mitigation system according to claim 1, wherein said system has a thickness and said electrically conductive layer is located near a mid-point of said thickness.

5. A lightning strike mitigation system according to claim 1, wherein said system has a thickness and said electrically conductive layer is located at a mid-point of said thickness.

6. A lightning strike mitigation system according to any one of claims 1, 5 and further comprising at least one of said inner and outer layers being a multi-layer, non-homogeneous material of composite make-up.

7. A lightning strike mitigation system for protecting a surface comprising an inner insulating layer adjacent a surface to be protected, an outer insulating layer, and an intermediate layer formed from an electrically conductive material between said inner and outer insulating layers and at least one of said inner and outer layers being formed from an ablative insulating material with a 30% Ni fill.

8. A lightning strike mitigation system according to claim 7, wherein said inner and outer layers are each formed from an ablative insulating material.

9. A lightning strike mitigation system according to claim 7, wherein at least one of said inner and outer layers is formed from an ablative insulating material with no metal fill.

10. A lightning strike mitigation system according to claim 7, wherein said electrically conductive layer comprises a mesh material formed from a copper material or an aluminum material.

11. A lightning strike mitigation system according to claim 7, wherein said electrically conductive layer comprises a foil material formed from a copper material or an aluminum material.

12. A lightning strike mitigation system according to claim 7, wherein said system has a thickness and said electrically conductive layer is located near a mid-point of said thickness.

13. A lightning strike mitigation system according to claim 7, wherein said system has a thickness and said electrically conductive layer is located at a mid-point of said thickness.

* * * * *